United States Patent [19] [11] Patent Number: 5,911,820
Satoh et al. [45] Date of Patent: Jun. 15, 1999

[54] CONCRETE ADMIXTURE

[75] Inventors: Haruyuki Satoh; Fujio Yamato; Yoshinao Kono, all of Wakayama; Sayuri Nakamura, Hyogo, all of Japan

[73] Assignee: Kao Corporation, Tokyo, Japan

[21] Appl. No.: 09/029,031

[22] PCT Filed: Jun. 18, 1997

[86] PCT No.: PCT/JP97/02095

§ 371 Date: Feb. 20, 1998

§ 102(e) Date: Feb. 20, 1998

[87] PCT Pub. No.: WO97/48656

PCT Pub. Date: Dec. 24, 1997

[30] Foreign Application Priority Data

Jun. 21, 1996 [JP] Japan ................................. 8-161287

[51] Int. Cl.⁶ .................................................. C04B 24/26
[52] U.S. Cl. ...................... 106/823; 106/724; 106/725; 106/727; 106/728; 106/802; 106/808; 106/809; 106/810; 524/5
[58] Field of Search ..................... 106/724, 725, 106/727, 728, 802, 808, 809, 810, 823; 524/5

[56] References Cited

U.S. PATENT DOCUMENTS 5,651,817 7/1997 Yamato et al. ......................... 106/823
5,674,316 10/1997 Izumi et al. ........................... 106/823
5,707,445 1/1998 Yamato et al. ........................ 106/823
5,779,788 7/1998 Berke et al. .......................... 106/823

FOREIGN PATENT DOCUMENTS

| | | |
|---|---|---|
| 58-74552 | 5/1983 | Japan . |
| 59-162160 | 9/1984 | Japan . |
| 62-78137 | 4/1987 | Japan . |
| 2-211542 | 3/1990 | Japan . |
| 3-75252 | 3/1991 | Japan . |
| 7-223852 | 8/1995 | Japan . |

*Primary Examiner*—Anthony Green
*Attorney, Agent, or Firm*—Birch, Stewart, Kolasch & Birch, LLP

[57] ABSTRACT

A concrete admixture is provided, which is effective in imparting fluidity to a hydraulic composition such as cement paste, mortar or concrete, particularly in maintaining the fluidity of the composition and which hardly retards the hardening property of the composition. The concrete admixture comprises a copolymer comprising, as structural units, units derived from an ethylenically unsaturated monomer (a) having 25 to 300 moles of $C_2$–$C_3$ oxyalkylene groups per mole of copolymer and units derived from a monomer (b) of an alkyl, alkenyl or hydroxyalkyl ester of an ethylenically unsaturated mono- or di-carboxylic acid.

18 Claims, No Drawings

CONCRETE ADMIXTURE

This application is the national phase under 35 U.S.C. §371 of prior PCT International Application No., PCT/JP97/02095, which has an International filing date of Jun. 18, 1997, which designated the United States of America, the entire contents of which are hereby incorporated by reference.

FIELD OF THE INVENTION

The present invention relates to a concrete admixture. More specifically, it relates to a concrete admixture which is extremely effective in imparting fluidity to a hydraulic composition such as cement paste, mortar and concrete, particularly in retention of fluidity of the composition, and which hardly retards the hardening property of the composition.

BACKGROUND OF THE INVENTION

So-called high performance water reducing agents have been known for use in concrete admixtures and can impart high fluidity. Examples thereof include salts of naphthalenesulfonic acid/formaldehyde condensates (naphthalene derivatives), salts of melaminesulfonic acid/formaldehyde condensates (melamine derivatives), salts of sulfanilic acid/phenol formaldehyde co-condensates (aminosulfonic acid derivatives), salts of polycarboxylic acids (polycarboxylic acid derivatives) and so on.

Each of these admixtures has some problems even though each has excellent functions. For example, the naphthalene derivatives and the melamine derivatives are excellent in hardening characteristics, however, are problematic with regard to retention of fluidity (owing to their tendency to cause a slump loss). On the other hand the polycarboxylic acid derivatives is disadvantaged due to its retarding effect on the hardening property of the composition. Recently polycarboxylic acid concrete admixtures which can impart excellent fluidity have been developed, which makes it possible to attain excellent dispersion with a reduced amount of an admixture, and thereby the problem of retarding the hardening property is being solved. Such admixtures include water-soluble vinyl copolymers such as copolymers of polyalkylene glycol monoester monomers having unsaturated bonds with acrylic acid and/or unsaturated dicarboxylic acid monomers (see JP-A 58-74552, JP-A 62-78137, JP-A 62-119147, JP-A 3-75252 and JP-A 59-162160).

These water-soluble copolymers each exhibit an excellent dispersing effect even at relatively low concentrations, so that the retardation is improved comparatively. Further, as described in JP-A 59-162160, they are somewhat effective in maintaining the dispersion. However, the copolymers cannot satisfactorily effect on retention of fluidity for a long time.

Under these circumstances, the inventors of the present invention have proposed in JP-A 7-223852 (corresponding to WO-A 95/16643) an improvement of slump loss by the use of a copolymer having a long polyoxyalkylene chain as an admixture. The technique described therein makes it possible to maintain the slump at a suitable level for a long period of time for example 60 to 90 minutes.

However, ideally the slump is maintained for about 2 hours to cope with inevitable delays in concrete processing due to traffic jams or troubles in construction. Therefore, the above effect of maintaining the slump for about 90 minutes is still insufficient and ideally would be further improved. Further, an improvement in the effect of maintaining the slump is liable to cause a problem of retarding the hardening property, so that such an improvement is also required to be attained without retarding the hardening property.

SUMMARY OF THE INVENTION

The inventors of the present invention have intensively studied on gradual supply of a dispersing agent as a means for maintaining the dispersed state of cement particles and thereby keeping the slump for a long time. Namely, the inventors of the present invention have designed the molecular structure of a dispersing agent from the viewpoint of the rate of adsorption in a strongly ionized concrete system, and have found that a vinyl copolymer comprising an oxyalkylene group and a specific monomer exhibits an extremely excellent slump-maintaining effect and that the copolymer makes it possible to maintain the slump for a time much longer than that of the prior arts without retarding the hardening property. The present invention has been accomplished on the basis of these findings.

Namely, the present invention provides a concrete admixture comprising a copolymer comprising, as structural units, units derived from an ethylenically unsaturated monomer (a) having 25 to 300 moles of $C_2$–$C_3$ oxyalkylene groups and units derived from a monomer (b) of an alkyl, alkenyl or hydroxyalkyl ester of an ethylenically unsaturated mono- or di-carboxylic acid.

The present invention provides a method for dispersing a cement mixture with the copolymer.

The present invention provides a concrete composition comprising cement, aggregates and the copolymer.

The present invention provides use of the copolymer to mix and disperse a cement mixture.

The present invention also provides an embodiment, in which the copolymer comprising 10 to 30 mole % of the units (a), 50 to 70 mole % of the units (b) and 10 to 30 mole % of the units (c).

According to the invention, the dispersion can be maintained over a period of 120 minutes or longer. Retardation of the hardening property can be thereby reduced.

When the concrete admixture of the present invention is used for concrete, an extremely excellent slump-maintaining effect can be attained. Although the present invention should not be construed to be bound by the following theory, the reason for which is considered to be that the dispersing agent is gradually taken into hydrates of cement to prevent the fluidity from lowering. In other words, it is assumed that oxyalkylene groups and the units derived from the specific monomer in the copolymers of the present invention may influence the rate of adsorption to cement.

The concrete admixture of the present invention comprises a copolymer comprising, as structural units, units derived from an ethylenically unsaturated monomer (a) having 25 to 300 moles of $C_2$–$C_3$ oxyalkylene groups and units derived from a monomer (b) of an alkyl, alkenyl or hydroxyalkyl ester of an ethylenically unsaturated mono- or di-carboxylic acid. Therefore, carboxyl groups which serves as an adsorbing group is gradually increased through hydrolysis of ester with an alkali to result in supplying a freshly formed dispersant, which may be the reason why the fluidity is not lowered but maintained for a long period of time. When the copolymer has lengthened side chains by an increase in the mole number of oxyalkylene groups added, it exhibits an enhanced dispersing effect due to steric repulsion and therefore can impart fluidity even when a reduced amount is used. Therefore, the surface hydration of cement is little hindered to result in a slight retardation of the hardening property. However, the present invention is not limited by these assumptions.

DETAILED DESCRIPTION

In the copolymer of the present invention, the ethylenically unsaturated monomer (a) having 25 to 300 moles of $C_2$–$C_3$ oxyalkylene groups includes (meth)acrylic esters of methoxypolyalkylene glycols; polyalkylene glycol monoallyl ethers; and adducts of dicarboxylic acids such as maleic anhydride, itaconic anhydride, citraconic anhydride, maleic acid, itaconic acid and citraconic acid, acrylamide and acrylalkylamide with $C_2$–$C_3$ oxyalkylene groups. Preferable examples of the monomer (a) include those represented by the following general formula (A):

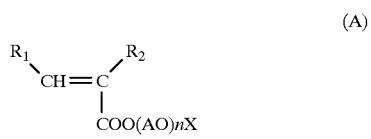

wherein $R_1$ and $R_2$ are each hydrogen atom or methyl, AO is a $C_2$–$C_3$ oxyalkylene group, n is a number of 25 to 300 and X is hydrogen atom or a $C_1$–$C_3$ alkyl group.

Specific examples of the monomer (a) represented by the above formula (A) include acrylic and methacrylic esters of polyalkylene glycols blocked with an alkyl group at one end such as methoxypolyethylene glycol, methoxypolyethylenepolypropylene glycol, ethoxypolyethylene glycol, ethoxypolyethylenepolypropylene glycol, propoxypolyethylene glycol and propoxypolyethylenepolypropylene glycol; and adducts of acrylic and methacrylic acids with ethylene oxide and propylene oxide. The molar addition number of the oxyalkylene group is 25 to 300. When both ethylene oxide and propylene oxide are used, the copolymer may take any form of random addition, block addition and alternating addition. It is preferable from the viewpoint of not causing any retardation of the hardening of concrete that the number of the oxyalkylene group is 50 or above, particularly 110 or above. When the number exceeds 300, not only the polymerizability of the monomer will be poor but also the resulting copolymer will be poor in the dispersing effect.

Preferable examples of alkyl, alkenyl or hydroxyalkyl ester of an ethylenically unsaturated mono- or di-carboxylic acid to be used as the monomer (b) in the present invention include unsaturated monocarboxylate ester represented by, e.g., the following general formula (B):

wherein $R_3$ is hydrogen atom or methyl and $R_4$ is a $C_1$–$C_{18}$ alkyl or alkenyl group or a $C_2$–$C_6$ hydroxyalkyl group.

Specific examples of the monomer (b) include $C_1$–$C_{18}$ linear and branched alkyl (meth)acrylates; $C_1$–$C_{18}$ linear and branched alkenyl (meth)acrylates; $C_2$–$C_6$ hydroxyalkyl (meth)acrylates; di($C_1$–$C_{18}$ linear and branched alkyl) esters of maleic acid, fumaric acid, itaconic acid and citraconic acid; and di($C_1$–$C_{18}$ linear and branched alkenyl) esters of maleic acid, fumaric acid, itaconic acid and citraconic acid.

It is particularly preferable in the solubility of the copolymer in water that $R_4$ in the above general formula (B) be one having 1 to 4 carbon atoms, though $R_4$ is not particularly limited in the form but may be any of linear and branched ones.

The copolymer according to the present invention is excellent in the effect of maintaining the slump, preferably when the proportions of the units (a) and (b) are 0.1 to 50 mole % and 50 to 99.9 mole % respectively. In particular, when the proportions of the monomers (a) and (b) are 1 to 40 mole % and 60 to 99 mole % respectively, the resulting copolymer exhibits an excellent effect of low fluidity loss and is extremely excellent in the retention of slump. When the proportions of the monomers are outside the above ranges, the copolymer shows poor retention of slump.

The copolymer according to the present invention may further contain units derived from a monomer (c) as structural units. The monomer (c) is an ethylenically unsaturated monocarboxylic acid or a salt thereof, or an ethylenically unsaturated dicarboxylic acid or an anhydride or salt thereof, and can be represented by, e.g., the following general formula (C):

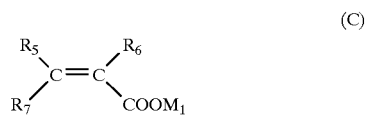

wherein $M_1$ is hydrogen atom, an alkali metal, an alkaline earth metal, ammonium, an alkylammonium or a substituted alkylammonium group; $R_5$, $R_6$ and $R_7$ are each hydrogen atom, methyl or $(CH_2)_{m2}COOM_2$; $M_2$ has the same definition as $M_1$; $m_2$ is 0 or 1.

Specific examples of the monomer (c) to be used include monocarboxylic acid monomers such as acrylic acid, methacrylic acid and crotonic acid and salts thereof with alkali metals, ammonium, amines and substituted amines; and unsaturated dicarboxylic acid monomers such as maleic acid, itaconic acid, citraconic acid and fumaric acid and salts thereof with alkali metals, alkaline earth metals, ammonium, amines and substituted amines. Further, the copolymer may contain other monomer such as acrylamide, vinyl acetate, styrene and vinyl chloride.

In the case wherein the copolymer contains the monomer unit (c), the copolymer is excellent in the effect of maintaining the slump, preferably when the proportions of the units (a), (b) and (c) are 0.1 to 50 mole %, 50 to 90 mole % and 0.1 to 50 mole % respectively. In particular, when the proportions of the units (a), (b) and (c) are 5 to 40 mole %, 50 to 90 mole % and 5 to 40 mole %, the resulting copolymer exhibits almost no fluidity loss and shows excellent balance between initial dispersibility and retention of fluidity to permit a reduction in the amount of the admixture used.

The copolymer according to the present invention can be prepared by known processes, e.g. solution polymerization described in JP-A 62-119147 and JP-A 62-78137. That is, the copolymer can be prepared by polymerising the monomers (a) and (b), or the monomers (a), (b) and (c) in a suitable solvent at the above-described reacting ratio.

The solvent to be used in the solution polymerization includes water, methyl alcohol, ethyl alcohol, isopropyl alcohol, benzene, toluene, xylene, cyclohexane, n-hexane, ethyl acetate, acetone, methyl ethyl ketone and so on. It is preferable from the viewpoints of handleability and reaction equipment to use water, methyl alcohol, ethyl alcohol and isopropyl alcohol.

Examples of the polymerization initiator usable in an aqueous medium include ammonium and alkali metal salts of persulfuric acid; hydrogen peroxide; and water-soluble azo compounds such as 2,2'-azobis(2-amidinopropane) dihydrochloride and 2,2'-azobis(2-methylpropionamide) dehydrate. Examples of the polymerization initiator usable in conducting the solution polymerization in a non-aqueous medium include peroxides such as benzoyl peroxide and lauroyl peroxide; and aliphatic azo compounds such as azobisisobutyronitrile.

A polymerization accelerator such as sodium hydrogensulfite and amine compounds may be used simultaneously with the polymerization initiator. Further, a chain transfer agent such as 2-mercaptoethanol, mercaptoacetic acid, 1-mercaptoglycerin, mercaptosuccinic acid or alkylmercaptan may be simultaneously used for the purpose of controlling the molecular weight.

It is preferable that the copolymer according to the present invention have a weight-average molecular weight of 8,000 to 1,000,000, still preferably 10,000 to 300,000 (in terms of polyethylene glycol as determined by gel permeation chromatography). When the molecular weight is too large, the copolymer will be poor in the dispersing property, while when it is too small, the copolymer will be poor in the property of maintaining the slump.

The copolymer according to the present invention may further comprises other comonomers, as far as the effects of the present invention are not adversely affected. Examples of such comonomers include acrylonitrile, methallylsulfonic acid, acrylamide, methacrylamide, styrene and styrenesulfonic acid.

It is preferable that the amount of the concrete admixture added to concrete be 0.02 to 1.0% by weight, still preferably 0.05 to 0.5% by weight based on cement in terms of solid matter.

The concrete admixture of the present invention may further contain the above-described high performance water reducing agent.

Examples of the high performance water reducing agent include naphthalene derivatives such as Mighty 150 (a product of Kao Corporation), melamine derivatives such as Mighty 150V-2 (a product of Kao Corporation), aminosulfonic acid derivatives such as Paric FP (a product of Fujisawa Chemicals), and polycarboxylic acid derivatives such as Mighty 2000WHZ (a product of Kao Corporation). Among these known high performance water reducing agents, it is particularly preferable to use a copolymer described in JP-A 7-223852 (corresponding to WO-A 95/16643) which is prepared by copolymerizing a polyalkylene glycol monoester monomer, wherein the polyalkylene glycol moiety is composed of 110 to 300 moles of oxyalkylene groups having 2 to 3 carbon atoms, with an acrylic acid monomer, because the copolymer is excellent in maintaining the fluidity showing little retardation of the hardening property.

It is preferable from the viewpoint of maintaining the fluidity that the weight ratio of the concrete admixture of the present invention to the high performance water reducing agent lies between 1:99 and 99:1 (with the proviso that the sum total is 100% by weight), more preferably between 10:90 and 90:10.

The concrete admixture of the present invention may be used in combination with other known additives. Examples of such additives include an air entraining (AE) agent, an AE water-reducing agent, a plasticizer, a retarder, an early-strength enhancer, an accelerator, a foaming agent, a blowing agent, an antifoaming agent, a thickener, a waterproofing agent, a defoaming agent, quartz sand, blast furnace slag, fly ash, silica fume and so on.

The concrete admixture of the present invention can be added to a composition containing a hydraulic cement. Examples of the composition include cement pastes, mortars and concretes, though the composition is not particularly limited.

EXAMPLES

The present invention will now be described specifically by referring to the following Examples, though the present invention is not limited by them. In the Examples, all percentages are by weight.

The weight-average molecular weights of copolymers given in the Examples are those in terms of polyethylene glycol as determined by gel permeation chromatography.

The compounds used in the following Examples as the monomer (a) will now be listed together with their symbols, wherein EO and PO refer to ethylene oxide and propylene oxide respectively; and molar addition numbers are given in terms of average ones.

A-1: methoxypolyethylene glycol methacrylate (The number of EO added: 130)
A-2: methoxypolyethylene glycol methacrylate (The number of EO added: 185)
A-3: methoxypolyethylene glycol acrylate (The number of EO added: 280)
A-4: methoxypolypropylenepolyethylene glycol(random adduct) methacrylate (The number of EO added: 125, number of PO added: 15)
A-5: adduct of maleic acid with EO (The number of EO added: 120)
A-6: adduct of allyl alcohol with EO (The number of EO added: 120)
A-7: adduct of acrylamide with EO (The number of EO added: 118)
A-8: methoxypolyethylene glycol methacrylate (The number of EO added: 28)
A-9: methoxypolyethylene glycol methacrylate (The number of EO added: 90)
A-10 (Comp.): methoxypolyethylene glycol methacrylate (The number of EO added: 350)
A-11 (Comp.): methoxypolyethylene glycol methacrylate (The number of EO added: 13)

Production Examples for the copolymers will now be described.

Production Example 1 (Admixture C-1)

Water (26 mol) was charged into a reactor equipped with a stirrer, and the resulting system was purged with nitrogen under stirring, followed by heating to 75° C. in a nitrogen atmosphere. A solution comprising 0.05 mol of monomer A-1 and 0.95 mol of methyl acrylate, a 20% aqueous solution of ammonium persulfate (0.05 mol) and a 20% aqueous solution of 2-mercaptoethanol (0.1 mol) were separately and simultaneously dropped into the reactor in 2 hours. Then, a 20% aqueous solution of ammonium persulfate (0.02 mol) was dropped into the reactor in 30 minutes. The resulting mixture was aged at that temperature (75° C.) for one hour and thereafter heated to 95° C. 35% hydrogen peroxide (0.2 mol) was dropped into the resulting mixture in 30 minutes and the mixture thus obtained was aged at that temperature (95° C.) for 2 hours. Thus, a copolymer having a molecular weight of 20,000 was obtained.

Production Example 2 (Admixture C-2)

Water (70 mol) was charged into a reactor equipped with a stirrer, and the resulting system was purged with nitrogen under stirring, followed by heating to 75° C. in a nitrogen atmosphere. A solution comprising 0.1 mol of monomer A-2, 0.8 mol of methyl acrylate and 0.1 mol of methacrylic acid, a 20% aqueous solution of ammonium persulfate (0.05 mol) and a 20% aqueous solution of 2-mercaptoethanol (0.1 mol) were separately and simultaneously dropped into the reactor in 2 hours. Then, a 20% aqueous solution of ammonium persulfate (0.2 mol) was dropped into the reactor in 30 minutes. The resulting mixture was aged at that temperature (75° C.) for one hour and thereafter heated to 95° C. 35% Hydrogen peroxide (0.2 mol) was dropped into the resulting mixture in 30 minutes and the mixture thus obtained was aged at that temperature (95° C.) for 2 hours. After the completion of the aging, 48% sodium hydroxide (0.07 mol) was added to the mixture. Thus, a copolymer having a molecular weight of 56,000 was obtained.

Production Example 3 (Admixture C-3)

Water (209 mol) was charged into a reactor equipped with a stirrer, and the resulting system was purged with nitrogen under stirring, followed by heating to 75° C. in a nitrogen atmosphere. A solution comprising 0.2 mol of monomer A-3, 0.6 mol of ethyl acrylate and 0.2 mol of acrylic acid, a 20% aqueous solution of ammonium persulfate (0.05 mol) and a 20% aqueous solution of 2-mercaptoethanol (0.1 mol) were separately and simultaneously dropped into the reactor in 2 hours. Then, a 20% aqueous solution of ammonium persulfate (0.02 mol) was dropped into the reactor in 30 minutes. The resulting mixture was aged at that temperature (75° C.) for one hour and thereafter heated to 95° C. 35% Hydrogen peroxide (0.2 mol) was dropped into the resulting mixture in 30 minutes and the mixture thus obtained was aged at that temperature (95° C.) for 2 hours. After the completion of the aging, 48% sodium hydroxide (0.15 mol) was added to the mixture. Thus, a copolymer having a molecular weight of 134,000 was obtained.

Production Example 4 (Admixture C-4)

Water (58 mol) was charged into a reactor equipped with a stirrer, and the resulting system was purged with nitrogen under stirring, followed by heating to 75° C. in a nitrogen atmosphere. A solution comprising 0.1 mol of monomer A-4, 0.7 mol of methyl methacrylate and 0.2 mol of acrylic acid, a 10% aqueous solution of 2,2'-azobis(2-amidinopropane) dihydrochloride (0.02 mol) and a 20% aqueous solution of 2-mercaptoethanol (0.08 mol) were separately and simultaneously dropped into the reactor in 2 hours. After the completion of the dropping, the resulting mixture was aged at that temperature (75° C.) for one hour and thereafter heated to 95° C. 35% Hydrogen peroxide (0.15 mol) was dropped into the resulting mixture in 30 minutes and the mixture thus obtained was aged at that temperature (95° C.) for 2 hours. After the completion of the aging, 48% sodium hydroxide (0.15 mol) was added to the mixture. Thus, a copolymer having a molecular weight of 68,000 was obtained.

Production Example 5 (Admixture C-5)

Water (101 mol) was charged into a reactor equipped with a stirrer, and the resulting system was purged with nitrogen under stirring, followed by heating to 75° C. in a nitrogen atmosphere. A solution comprising 0.2 mol of monomer A-1, 0.6 mol of isobutyl acrylate and 0.2 mol of acrylic acid, a 20% aqueous solution of ammonium persulfate (0.05 mol) and a 20% aqueous solution of 2-mercaptoethanol (0.04 mol) were separately and simultaneously dropped into the reactor in 2 hours. Then, a 20% aqueous solution of ammonium persulfate (0.02 mol) was dropped into the reactor in 30 minutes. The resulting mixture was aged at that temperature (75° C.) for one hour and thereafter heated to 95° C. 35% Hydrogen peroxide (0.1 mol) was dropped into the resulting mixture in 30 minutes and the mixture thus obtained was aged at that temperature (95° C.) for 2 hours. After the completion of the aging, 48% sodium hydroxide (0.15 mol) was added to the mixture. Thus, a copolymer having a molecular weight of 112,000 was obtained.

Production Example 6 (Admixture C-6)

Water (56 mol) was charged into a reactor equipped with a stirrer, and the resulting system was purged with nitrogen under stirring, followed by heating to 75° C. in a nitrogen atmosphere. A solution comprising 0.25 mol of monomer A-1, 0.55 mol of ethyl acrylate and 0.2 mol of methacrylic acid, a 20% aqueous solution of ammonium persulfate (0.05 mol) and a 20% aqueous solution of mercaptosuccinic acid (0.08 mol) were separately and simultaneously dropped into the reactor in 2 hours. Then, a 20% aqueous solution of ammonium persulfate (0.02 mol) was dropped into the reactor in 30 minutes. The resulting mixture was aged at that temperature (75° C.) for one hour. After the completion of the aging, 48% sodium hydroxide (0.15 mol) was added to the mixture. Thus, a copolymer having a molecular weight of 86,000 was obtained.

Production Example 7 (Admixture C-7)

Water (56 mol) was charged into a reactor equipped with a stirrer, and the resulting system was purged with nitrogen under stirring, followed by heating to 75° C. in a nitrogen atmosphere. A solution comprising 0.25 mol of monomer A-5, 0.55 mol of methyl acrylate and 0.2 mol of monosodium maleate, a 20% aqueous solution of ammonium persulfate (0.05 mol) and a 20% aqueous solution of mercaptosuccinic acid (0.08 mol) were separately and simultaneously dropped into the reactor in 2 hours. Then, a 20% aqueous solution of ammonium persulfate (0.02 mol) was dropped into the reactor in 30 minutes. The resulting mixture was aged at that temperature (75° C.) for one hour. After the completion of the aging, 48% sodium hydroxide (0.07 mol) was added to the mixture. Thus, a copolymer having a molecular weight of 34,000 was obtained.

Production Example 8 (Admixture C-8)

Water (50 mol) was charged into a reactor equipped with a stirrer, and the resulting system was purged with nitrogen under stirring, followed by heating to 75° C. in a nitrogen atmosphere. A solution comprising 0.25 mol of monomer A-6, 0.55 mol of methyl acrylate and 0.2 mol of monosodium maleate, a 20% aqueous solution of ammonium persulfate (0.05 mol) and a 20% aqueous solution of mercaptosuccinic acid (0.08 mol) were separately and simultaneously dropped into the reactor in 2 hours. Then, a 20% aqueous solution of ammonium persulfate (0.02 mol) was dropped into the reactor in 30 minutes. The resulting mixture was aged at that temperature (75° C.) for one hour. After the completion of the aging, 48% sodium hydroxide (0.07 mol) was added to the mixture. Thus, a copolymer having a molecular weight of 31,000 was obtained.

Production Example 9 (Admixture C-9)

Water (50 mol) was charged into a reactor equipped with a stirrer, and the resulting system was purged with nitrogen under stirring, followed by heating to 75° C. in a nitrogen atmosphere. A solution comprising 0.25 mol of monomer A-7, 0.55 mol of methyl acrylate and 0.2 mol of methacrylic acid, a 20% aqueous solution of ammonium persulfate (0.05 mol) and a 20% aqueous solution of mercaptosuccinic acid (0.08 mol) were separately and simultaneously dropped into the reactor in 2 hours. Then, a 20% aqueous solution of ammonium persulfate (0.02 mol) was dropped into the reactor in 30 minutes. The resulting mixture was aged at that temperature (75° C.) for one hour. After the completion of the aging, 48% sodium hydroxide (0.15 mol) was added to the mixture. Thus, a copolymer having a molecular weight of 53,000 was obtained.

Production Example 10 (Admixture C-10)

Water (30 mol) was charged into a reactor equipped with a stirrer, and the resulting system was purged with nitrogen under stirring, followed by heating to 75° C. in a nitrogen atmosphere. A solution comprising 0.20 mol of monomer A-8, 0.60 mol of ethyl acrylate and 0.2 mol of methacrylic acid, a 20% aqueous solution of ammonium persulfate (0.05 mol) and a 20% aqueous solution of 2-mercaptoethanol (0.08 mol) were separately and simultaneously dropped into the reactor in 2 hours. Then, a 20% aqueous solution of ammonium persulfate (0.01 mol) was dropped into the reactor in 30 minutes. The resulting mixture was aged at that temperature (75° C.) for one hour and thereafter heated to 95° C. 35% Hydrogen peroxide (0.1 mol) was dropped into the resulting mixture in 30 minutes, and the obtained mixture was aged at that temperature (95° C.) for 2 hours. After the completion of the aging, 48% sodium hydroxide (0.15 mol) was added to the mixture. Thus, a copolymer having a molecular weight of 36,000 was obtained.

Production Example 11 (Admixture C-11)

Water (50 mol) was charged into a reactor equipped with a stirrer, and the resulting system was purged with nitrogen under stirring, followed by heating to 75° C. in a nitrogen atmosphere. A solution comprising 0.15 mol of monomer A-9, 0.75 mol of diethyl maleate and 0.1 mol of methacrylic acid, a 20% aqueous solution of ammonium persulfate (0.08 mol) and a 20% aqueous solution of 2-mercaptoethanol (0.10 mol) were separately and simultaneously dropped into the reactor in 2 hours. Then, a 20% aqueous solution of ammonium persulfate (0.01 mol) was dropped into the reactor in 30 minutes. The resulting mixture was aged at that temperature (75° C.) for one hour and thereafter heated to 95° C. 35% Hydrogen peroxide (0.1 mol) was dropped into the resulting mixture in 30 minutes, and the obtained mixture was aged at that temperature (95° C. for 2 hours. After the completion of the aging, 48% sodium hydroxide (0.07 mol) was added to the mixture. Thus, a copolymer having a molecular weight of 54,000 was obtained.

Production Example 12 (Admixture C-12)

Water (50 mol) was charged into a reactor equipped with a stirrer, and the resulting system was purged with nitrogen under stirring, followed by heating to 75° C. in a nitrogen atmosphere. A solution comprising 0.40 mol of monomer A-8 and 0.60 mol of methyl methacrylate, a 20% aqueous solution of ammonium persulfate (0.10 mol) and a 20% aqueous solution of 2-mercaptoethanol (0.06 mol) were separately and simultaneously dropped into the reactor in 2 hours. Then, a 20% aqueous solution of ammonium persulfate (0.01 mol) was dropped into the reactor in 30 minutes. The resulting mixture was aged at that temperature (75° C.) for one hour and thereafter heated to 95° C., 35% Hydrogen peroxide (0.1 mol) was dropped into the resulting mixture in 30 minutes, and the obtained mixture was aged at that temperature (95° C.) for 2 hours. Thus, a copolymer having a molecular weight of 83,000 was obtained.

Production Example 13 (Admixture C-13)

Water (45 mol) was charged into a reactor equipped with a stirrer, and the resulting system was purged with nitrogen under stirring, followed by heating to 75° C. in a nitrogen atmosphere. A solution comprising 0.1 mol of monomer A-1, 0.7 mol of methyl acrylate and 0.2 mol of methacrylic acid, a 20% aqueous solution of ammonium persulfate (0.05 mol) and a 20% aqueous solution of mercaptosuccinic acid (0.08 mol) were separately and simultaneously dropped into the reactor in 2 hours. Then, a 20% aqueous solution of ammonium persulfate (0.02 mol) was dropped into the reactor in 30 minutes. The resulting mixture was aged at that temperature (75° C.) for one hour. After the completion of the aging, 48% sodium hydroxide (0.15 mol) was added to the mixture. Thus, a copolymer having a molecular weight of 57,000 was obtained.

Production Example 14 (Admixture C-14)

Water (22 mol) was charged into a reactor equipped with a stirrer, and the resulting system was purged with nitrogen under stirring, followed by heating to 75° C. in a nitrogen atmosphere. A solution comprising 0.2 mol of monomer A-8 and 0.8 mol of methacrylic acid, a 20% aqueous solution of ammonium persulfate (0.02 mol) and a 20% aqueous solution of 2-mercaptoethanol (0.05 mol) were separately and simultaneously dropped into the reactor in 2 hours. Then, a 20% aqueous solution of ammonium persulfate (0.01 mol) was dropped into the reactor in 30 minutes. The resulting mixture was aged at that temperature (75° C.) for one hour and thereafter heated to 95° C. 35% Hydrogen peroxide (0.1 mol) was dropped into the resulting mixture in 30 minutes, and the obtained mixture was aged at that temperature (95° C.) for 2 hours. After the completion of the aging, 48% sodium hydroxide (0.6 mol) was added to the mixture. Thus, a copolymer having a molecular weight of 23,000 was obtained.

Production Example 15 (Admixture C-15)

Water (70 mol) was charged into a reactor equipped with a stirrer, and the resulting system was purged with nitrogen under stirring, followed by heating to 75° C. in a nitrogen atmosphere. A solution comprising 0.2 mol of monomer A-2 and 0.8 mol of methacrylic acid, a 20% aqueous solution of ammonium persulfate (0.05 mol) and a 20% aqueous solution of 2-mercaptoethanol (0.1 mol) were separately and simultaneously dropped into the reactor in 2 hours. Then, a 20% aqueous solution of ammonium persulfate (0.02 mol) was dropped into the reactor in 30 minutes. The resulting mixture was aged at that temperature (75° C.) for one hour and thereafter heated to 95° C. 35% Hydrogen peroxide (0.2 mol) was dropped into the resulting mixture in 30 minutes, and the obtained mixture was aged at that temperature (95° C.) for 2 hours. After the completion of the aging, 48% sodium hydroxide (0.6 mol) was added to the mixture. Thus, a copolymer having a molecular weight of 78,000 was obtained.

Production Example 16 (Admixture C-16)

Water (135 mol) was charged into a reactor equipped with a stirrer, and the resulting system was purged with nitrogen under stirring, followed by heating to 75° C. in a nitrogen atmosphere. A solution comprising 0.2 mol of monomer A-10, 0.7 mol of methyl acrylate and 0.1 mol of methacrylic acid, a 20% aqueous solution of ammonium persulfate (0.03 mol) and a 20% aqueous solution of 2-mercaptoethanol (0.05 mol) were separately and simultaneously dropped into the reactor in 2 hours. Then, a 20% aqueous solution of ammonium persulfate (0.01 mol) was dropped into the reactor in 30 minutes. The resulting mixture was aged at that temperature (75° C.) for one hour and thereafter heated to 95° C. 35% Hydrogen peroxide (0.1 mol) was dropped into the resulting mixture in 30 minutes, and the obtained mixture was aged at that temperature (95° C.) for 2 hours. After the completion of the aging, 48% sodium hydroxide (0.07 mol) was added to the mixture. Thus, a copolymer having a molecular weight of 145,000 was obtained.

Production Example 17 (Admixture C-17)

Water (50 mol) was charged into a reactor equipped with a stirrer, and the resulting system was purged with nitrogen under stirring, followed by heating to 75° C. in a nitrogen atmosphere. A solution comprising 0.65 mol of monomer A-8 and 0.35 mol of methyl methacrylate, a 20% aqueous solution of ammonium persulfate (0.1 mol) and a 20% aqueous solution of 2-mercaptoethanol (0.10 mol) were separately and simultaneously dropped into the reactor in 2 hours. Then, a 20% aqueous solution of ammonium persulfate (0.01 mol) was dropped into the reactor in 30 minutes. The resulting mixture was aged at that temperature (75° C.) for one hour and thereafter heated to 95° C. 35% Hydrogen peroxide (0.1 mol) was dropped into the resulting mixture in 30 minutes, and the obtained mixture was aged at that temperature (95° C.) for 2 hours. Thus, a copolymer having a molecular weight of 265,000 was obtained.

Production Example 18 (Admixture C-18)

Water (30 mol) was charged into a reactor equipped with a stirrer, and the resulting system was purged with nitrogen under stirring, followed by heating to 75° C. in a nitrogen atmosphere. A solution comprising 0.2 mol of monomer A-11 and 0.8 mol of methyl acrylate, a 20% aqueous solution of ammonium persulfate (0.1 mol) and a 20% aqueous solution of 2-mercaptoethanol (0.06 mol) were separately and simultaneously dropped into the reactor in 2 hours. Then, a 20% aqueous solution of ammonium persulfate (0.01 mol) was dropped into the reactor in 30 minutes. The resulting mixture was aged at that temperature (75° C.) for one hour and thereafter heated to 95° C. 35% Hydrogen peroxide (0.1 mol) was dropped into the resulting mixture in 30 minutes, and the obtained mixture was aged at that temperature (95° C.) for 2 hours. Thus, a copolymer having a molecular weight of 56,000 was obtained.

Comparative admixtures other than the comparative copolymers were also used in the Examples. The comparative admixtures will now be described together with their symbols.

NS
   an admixture comprising salt of naphthalenesulfonic acid-formaldehyde condensate (Mighty 150, a product of Kao Corporation), and MS
   an admixture comprising salt of melamine-sulfonic acid-formaldehyde condensate (Mighty 150V-2, a product of Kao Corporation).

Concrete admixtures according to the present invention and comparative ones were evaluated by the following method.

Evaluation as Concrete Admixture

Materials for concrete were prepared according to the conditions specified in Table 1.

TABLE 1

| | | Unit amt. (kg/m³) | | | |
|---|---|---|---|---|---|
| W/C (%) | s/a (%) | C | W | S | G |
| 57 | 48 | 300 | 170 | 867 | 951 |

Materials used
W: tap water
C: normal Portland cement, a product of Onoda Cement Co. Ltd. (specific gravity: 3.16)
S: river sand from the Kino river (specific gravity: 2.60)
G: crushed stone from Takarazuka (specific gravity: 2.63)
s/a: sand/(sand + gravel) (volume ratio)

The materials specified in Table 1 and each admixture were mixed in a tilting mixer at 25 rpm for 3 minutes to prepare a concrete. The concretes thus prepared were examined for fluidity (slump value) according the method stipulated in JIS-A1101. Then, the concretes were each further mixed at 4 rpm to determine the slump value (cm) over the period of 120 minutes. The setting time of each concrete was determined by the method stipulated in JIS-A6204 attachment 1. The initial slump of each concrete was adjusted to 20±1 cm by regulating the amount of the admixture to be added. The results are given in Table 2.

TABLE 2

| Division | Symbol of admixture | Amt. of adding *1(%) | Slump value (cm) | | | | | Setting time (h-min) | |
|---|---|---|---|---|---|---|---|---|---|
| | | | just after | after 30 min. | after 60 min. | after 90 min. | after 120 min. | initial setting | final setting |
| Invention product | C-1 | 0.27 | 19.0 | 21.2 | 22.0 | 22.5 | 22.5 | 4-52 | 6-31 |
| | C-2 | 0.23 | 20.0 | 20.3 | 20.5 | 20.0 | 18.0 | 4-33 | 6-15 |
| | C-3 | 0.18 | 19.5 | 20.0 | 19.5 | 18.0 | 17.5 | 4-36 | 6-20 |
| | C-4 | 0.18 | 20.4 | 19.5 | 19.0 | 18.5 | 17.3 | 4-39 | 6-28 |
| | C-5 | 0.20 | 19.5 | 19.5 | 18.5 | 18.0 | 17.2 | 4-48 | 6-55 |
| | C-6 | 0.25 | 20.8 | 20.3 | 19.5 | 19.2 | 18.5 | 4-55 | 6-32 |
| | C-7 | 0.29 | 20.0 | 19.5 | 19.0 | 18.5 | 15.5 | 5-13 | 6-58 |
| | C-8 | 0.28 | 20.5 | 20.0 | 19.5 | 19.0 | 16.0 | 5-08 | 6-41 |
| | C-9 | 0.30 | 20.5 | 20.0 | 19.0 | 19.0 | 15.5 | 5-19 | 6-57 |
| | C-10 | 0.26 | 19.8 | 19.5 | 18.2 | 17.0 | 15.2 | 6-02 | 8-13 |
| | C-11 | 0.32 | 20.2 | 19.9 | 19.0 | 17.3 | 15.8 | 5-58 | 7-49 |
| | C-12 | 0.28 | 19.2 | 19.5 | 19.3 | 18.8 | 17.6 | 6-38 | 8-23 |

TABLE 2-continued

| Division | Symbol of admixture | Amt. of adding *1(%) | Slump value (cm) | | | | | Setting time (h-min) | |
|---|---|---|---|---|---|---|---|---|---|
| | | | just after | after 30 min. | after 60 min. | after 90 min. | after 120 min. | initial setting | final setting |
| | C-13 | 0.25 | 20.6 | 20.5 | 20.0 | 19.5 | 19.2 | 4-52 | 6-27 |
| | C-1/C-15*2 | 0.22 | 20.5 | 20.6 | 20.5 | 20.3 | 20.0 | 4-18 | 6-02 |
| Comp. product | C-14 | 0.23 | 20.7 | 18.0 | 12.5 | 10.5 | 7.0 | 7-20 | 8-58 |
| | C-15 | 0.20 | 19.5 | 20.0 | 19.5 | 17.5 | 10.5 | 4-22 | 6-10 |
| | C-16 | 0.45 | 20.0 | 16.5 | 13.0 | 11.0 | 10.0 | 4-44 | 6-15 |
| | C-17 | 0.38 | 19.2 | 17.5 | 16.3 | 12.0 | 8.0 | 7-06 | 9-26 |
| | C-18 | 0.4 | 19.5 | 16.5 | 13.5 | 10.0 | 9.5 | 7-25 | 9-00 |
| | NS | 0.55 | 20.3 | 10.5 | 8.5 | 5.0 | 4.5 | 7-36 | 9-50 |
| | MS | 0.60 | 20.5 | 12.8 | 7.0 | 5.5 | 4.0 | 7-48 | 9-36 |

*1 weight % in terms of solid matter based on the weight of cement
*2 blend of invention C-1 with comparative C-15 (weight ratio: 50/50(%))

As apparent from the results given in Table 2, the admixtures of the present invention can maintain the slump value observed just after the preparation for a lengthened time and little retard the hardening property.

Further, the admixtures of the present invention make it possible to maintain the slump value for two or more hours, while the slump can be maintained only for at most 90 minutes when the polycarboxylic acid admixture of the comparative products are used.

Accordingly, a cement composition containing a concrete admixture of the present invention shows low level of slump loss for a long time, which facilitates the quality control of concrete even in the case wherein concrete is produced and placed under such conditions that the slump is more difficult to maintain, for example, high temperature in summer or low water/cement ratio or even in the case wherein the processing of concrete is delayed by some troubles.

C-4, C-5, C-6 and C-13 are in particular preferred.

We claim:

1. A concrete admixture comprising a copolymer comprising, as structural units, units derived from an ethylenically unsaturated monomer (a) having 25 to 300 moles of $C_2$–$C_3$ oxyalkylene groups per mole of copolymer and units derived from a monomer (b) of an alkyl, alkenyl or hydroxyalkyl ester of an ethylenically unsaturated mono- or di-carboxylic acid.

2. The admixture as claimed in claim 1, in which the copolymer further comprises units derived from a monomer (c) selected from the group consisting of an ethylenically unsaturated monocarboxylic acid, a salt thereof, an ethylenically unsaturated dicarboxylic acid, an anhydride thereof and a salt thereof.

3. The admixture as claimed in claim 1, in which the copolymer has been obtained by co-polymerising the monomer (a) with the monomer (b) at a reacting ratio of 0.1 to 50 mole % of (a) and 50 to 99.9 mole % of (b).

4. The admixture as claimed in claim 2, in which the copolymer has been obtained by co-polymerising the monomer (a), the monomer (b) and the monomer (c) at a reacting ratio of 0.1 to 50 mole % of (a), 50 to 90 mole % of (b) and 0.1 to 50 mole % of (c).

5. The admixture as claimed in claim 1 or 2, in which the monomer (a) is selected from the group consisting of (a-1) an ester product prepared by the reaction between methoxy-polyalkylene glycol having 25 to 300 moles of $C_2$–$C_3$ oxyalkylene groups per mole of the methoxy-polyalkylene glycol and either acrylic acid or methacrylic acid, (a-2) a monoallyl ether prepared by the reaction between polyalkylene glycol having 25 to 300 moles of $C_2$–$C_3$ oxyalkylene groups per mole of polyalkylene glycol and allyl alcohol, and (a-3) an adduct prepared by the reaction between maleic anhydride, itaconic anhydride, citraconic anhydride, maleic acid, itaconic acid, citraconic acid, acrylic amide or an acrylicalkyl amide and a polyalkylene glycol having 25 to 300 moles of $C_2$–$C_3$ oxyalkylene groups per mole of polyalkylene glycol.

6. The admixture as claimed in claim 1 or 2, in which the monomer (a) is defined by the formula (A):

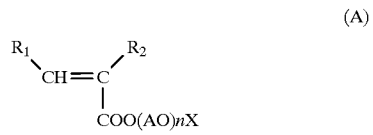

(A)

wherein $R_1$ and $R_2$ are each hydrogen atom or methyl, AO is a $C_2$–$C_3$ oxyalkylene group, n is a number of 25 to 300 and X is hydrogen atom or a $C_1$–$C_3$ alkyl group.

7. The admixture as claimed in claim 6, in which n is a number of 110 to 300.

8. The admixture as claimed in claim 1 or 2, in which the monomer (b) is an unsaturated monocarboxylate ester having the formula (B):

(B)

wherein $R_3$ is hydrogen atom or methyl and $R_4$ is a $C_1$–$C_{18}$ alkyl or alkenyl group or a $C_2$–$C_6$ hydroxyalkyl group.

9. The admixture as claimed in claim 1 or 2, in which the monomer (b) is selected from the group consisting of a maleic diester, a fumaric diester, an itaconic diester and a citraconic diester, each diester is bonded to a $C_1$–$C_{18}$, straight or branched, alkyl or alkenyl group.

10. The admixture as claimed in claim 2, in which the monomer (c) is defined by the formula (C):

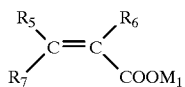

(C)

wherein $M_1$ is hydrogen atom, an alkali metal, an alkaline earth metal, ammonium, an alkylammonium or a substituted alkylammonium group; $R_5$, $R_6$ and $R_7$ are each hydrogen atom, methyl or $(CH_2)_{m2}COOM_2$; $M_2$ has the same definition as $M_1$; $m_2$ is 0 or 1.

11. The admixture as claimed in claim 1 or 2, in which the copolymer has a weight average molecular weight of 8,000 to 1,000,000.

12. The admixture as claimed in claim 2, wherein the copolymer comprises 10 to 30 mole % of the units (a), 50 to 70 mole % of the units (b) and 10 to 30 mole % of the units (c).

13. A concrete admixture composition comprising the copolymer as defined in claim 1 or 2 and at least one high performance water reducing agent selected from the group consisting of naphthalene derivatives, melamine derivatives, aminosulfonic acid derivatives and polycarboxylic acid derivatives.

14. The composition as claimed in claim 13, in which a mixing ratio of the copolymer to the high performance water reducing agent ranges between 10:90 and 90:10.

15. A method for dispersing a cement mixture which comprises adding to a hydraulic composition a copolymer comprising, as structural units, units derived from an ethylenically unsaturated monomer (a) having 25 to 300 moles of $C_2$–$C_3$ oxyalkylene groups per mole of copolymer and units derived from a monomer (b) of an alkyl, alkenyl or hydroxyalkyl ester of an ethylenically unsaturated mono- or di-carboxylic acid.

16. A method for dispersing a cement mixture according to claim 15, wherein the copolymer further comprises units derived from a monomer (c) selected from the group consisting of an ethylenically unsaturated monocarboxylic acid, a salt thereof, an ethylenically unsaturated dicarboxylic acid, an anhydride thereof and a salt thereof.

17. A concrete composition comprising cement, aggregates and the copolymer as defined in claim 1 or 2.

18. The concrete composition as claimed in claim 17, which comprises 0.02 to 1.0 percent by weight of the copolymer based on solid matter of the concrete.

* * * * *